United States Patent
Gharachorloo et al.

(10) Patent No.: US 9,305,311 B2
(45) Date of Patent: Apr. 5, 2016

(54) MOBILE PRICE MATCHING OF PLANNED PURCHASE ITEMS

(71) Applicant: Cellco Partnership, Basking Ridge, NJ (US)

(72) Inventors: Nader Gharachorloo, Ossining, NY (US); Farshid Mostoufi, Alpharetta, GA (US)

(73) Assignee: Cellco Partnership, Basking Ridge, NJ (US)

( * ) Notice: Subject to any disclaimer, the term of this patent is extended or adjusted under 35 U.S.C. 154(b) by 236 days.

(21) Appl. No.: 14/074,213

(22) Filed: Nov. 7, 2013

(65) Prior Publication Data

US 2015/0127428 A1    May 7, 2015

(51) Int. Cl.
*G06Q 30/02* (2012.01)

(52) U.S. Cl.
CPC .................................. *G06Q 30/0283* (2013.01)

(58) Field of Classification Search
CPC .................................................... G06Q 30/20
See application file for complete search history.

(56) References Cited

U.S. PATENT DOCUMENTS

| 2008/0114622 A1* | 5/2008 | Crean et al. ................ 705/5 |
| 2009/0164391 A1* | 6/2009 | Otto et al. ................ 705/400 |
| 2013/0317896 A1* | 11/2013 | Liberty ................ 705/14.23 |

* cited by examiner

*Primary Examiner* — Thomas Dixon

(57) ABSTRACT

A method may include receiving, from users, information identifying items purchased by the users, the information including a price for each of the items, and storing the information in a database. The method may also include receiving, from a second number of users, additional information identifying items purchased by the second users, the additional information including a price for each of the items, and identifying a first item in the database that matches a second item associated with purchases by one of the second users. The method may further include determining whether the price for the second item is lower than the price for the first item stored in the database and updating the database to include the second price for the first item, in response to determining that the second price is lower than the first price.

20 Claims, 9 Drawing Sheets

MOBILE PRICE MATCHING OF PLANNED PURCHASE ITEMS

BACKGROUND INFORMATION

Retailers often advertise price match guarantees to consumers. For example, a typical retailer may advertise that they will match the price for any item offered by another retailer. However, the consumer must provide the advertisement for the product offered by the other retailer. The retailer with whom the consumer is interacting must then determine whether the advertisement matches the product that the consumer wishes to purchase. This typically involves a store manager reviewing the advertisement to determine whether to honor the competitor's advertised price. As a result, the process is typically cumbersome and time consuming.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein provide a price lookup table that can be used by consumers to determine lowest prices for products that the consumers wish to purchase. In an exemplary implementation, a consumer may share receipts associated with purchases made by the consumer with a network device that acts as a repository or clearinghouse to store price information. The network device may receive receipts from thousands of consumers and generate a lookup table identifying the lowest price for the items identified by the receipts. In one implementation, when a consumer is shopping and prior to checking out and paying for the selected items, the consumer may query the lookup table via some type of computing device, such as a mobile phone. The network device may receive the query and identify whether any items identical to or similar to those planned for purchase were purchased at a lower price based on information stored in the lookup table. If any items are identified at a lower price, the network device may provide the lower price information to the consumer. The consumer may then present this information to the retailer for a price match.

Figure 1:
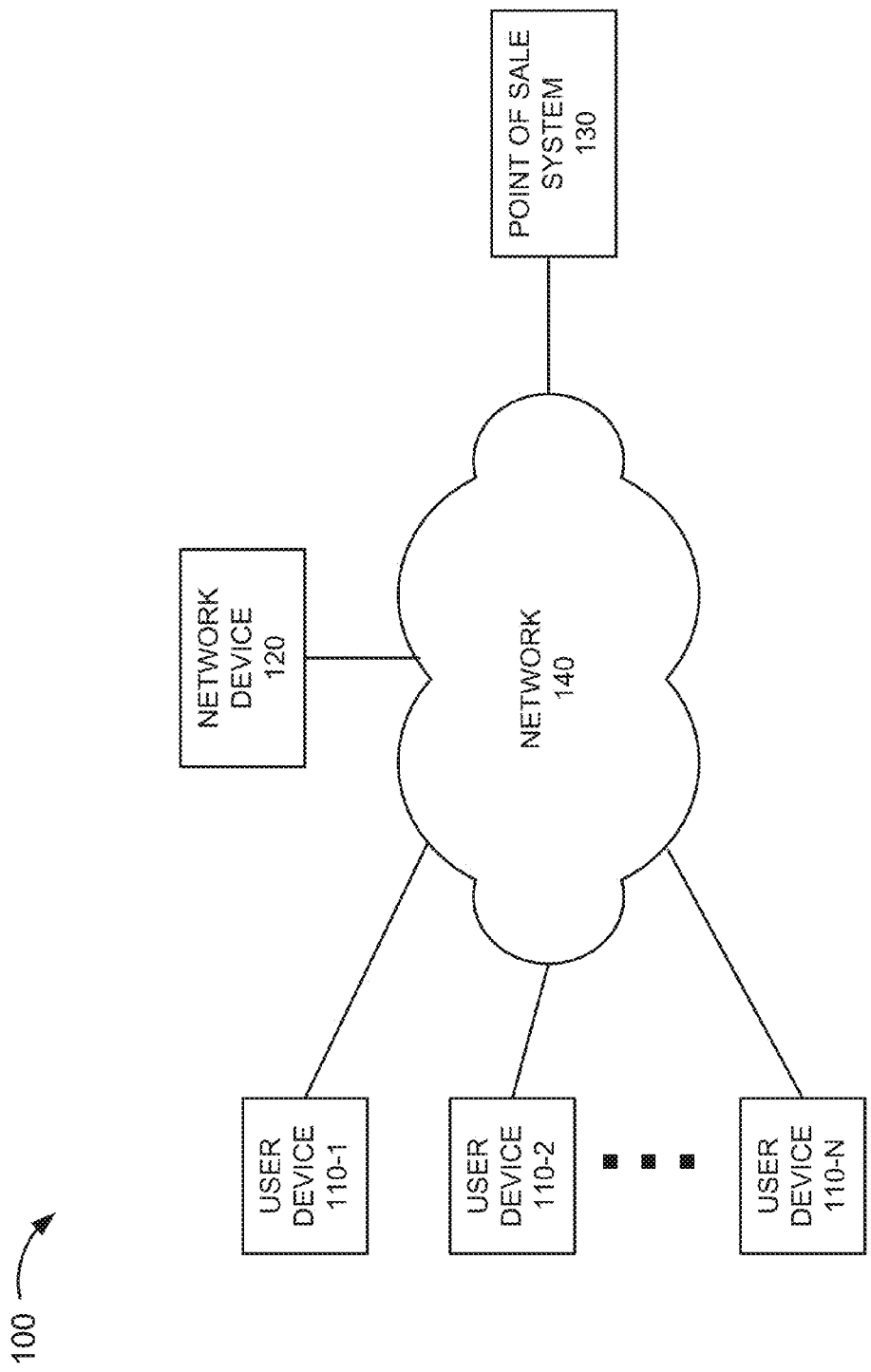
FIG. 1 illustrates an exemplary network in which systems and methods described herein may be implemented.

FIG. 1 is a block diagram of an exemplary network 100 in which systems and methods described herein may be implemented. Network 100 may include user devices 110-1 through 110-N (referred to individually as user device 110-X, where X is any integer, or user device 110, and collectively as user devices 110), network device 120, point of sale (POS) system 130 and network 140.

User devices 110 may each include a mobile device, such as wireless or cellular telephone device (e.g., a conventional cell phone with data processing capabilities), a smart phone, a personal digital assistant (PDA) that can include a radio-telephone, etc. User devices 110 may also include any type of computer device or system, such as a personal computer (PC), a laptop, a tablet computer, a notebook, a netbook, etc., that may include a display and communication functionality.

Network device 120 may include one or more computing devices, servers and/or backend systems that are able to connect to network 140 and transmit and/or receive information via network 140. In one implementation, network device 120 may receive information from user devices 110, such as digital receipts or other pricing information associated with purchases made by parties associated with user devices 110. Network device 120 may maintain a lookup table that tracks the pricing information, as described in more detail below. Network device 120 may also provide access to the lookup information to user devices 110 and point of sale system 130, as described in more detail below.

Point of sale system 130 may include one or more computing devices, servers and/or backend systems that are associated with a retailer's check out process. For example, POS system 130 may represent a location at which a retail transaction is completed and at which the consumer makes a payment to a retailer in exchange for goods or services. In an exemplary implementation, POS system 130 may include a scanner or other hardware and/or software to identify products and pricing information associated with the products. For example, POS system 130 may include a scanner that scans barcodes to identify products for purchase. POS system 130 may then access the retailer's database that stores pricing information for the products.

In an exemplary implementation, POS system 130 may communicate with user device 110 and/or network devices, such as network device 120, to provide an electronic receipt identifying the items to be purchased by the customer prior to the customer completing a transaction and paying for the items. This information may be used by the customer to perform a price check with a lookup table associated with purchases made by other consumers, as described in detail below. POS system 130 may also communicate with user device 110 and/or network device 120 to provide an electronic receipt or listing of items purchased by the consumer after the transaction has been completed. This information may be forwarded to network device 120 to populate a price lookup table, as described in more detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a WiFi network, an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100, may include thousands or millions of user devices 110 and POS systems 130. Network 100 may also include multiple network devices 120. In addition, network 140 may include additional elements, such as switches, gateways, routers, etc., that aid in routing data.

Further, various functions are described below as being performed by particular components in network 100. In other implementations, various functions described as being performed by one device may be performed by another device or multiple other devices, and/or various functions described as being performed by multiple devices may be combined and performed by a single device.

Figure 2:
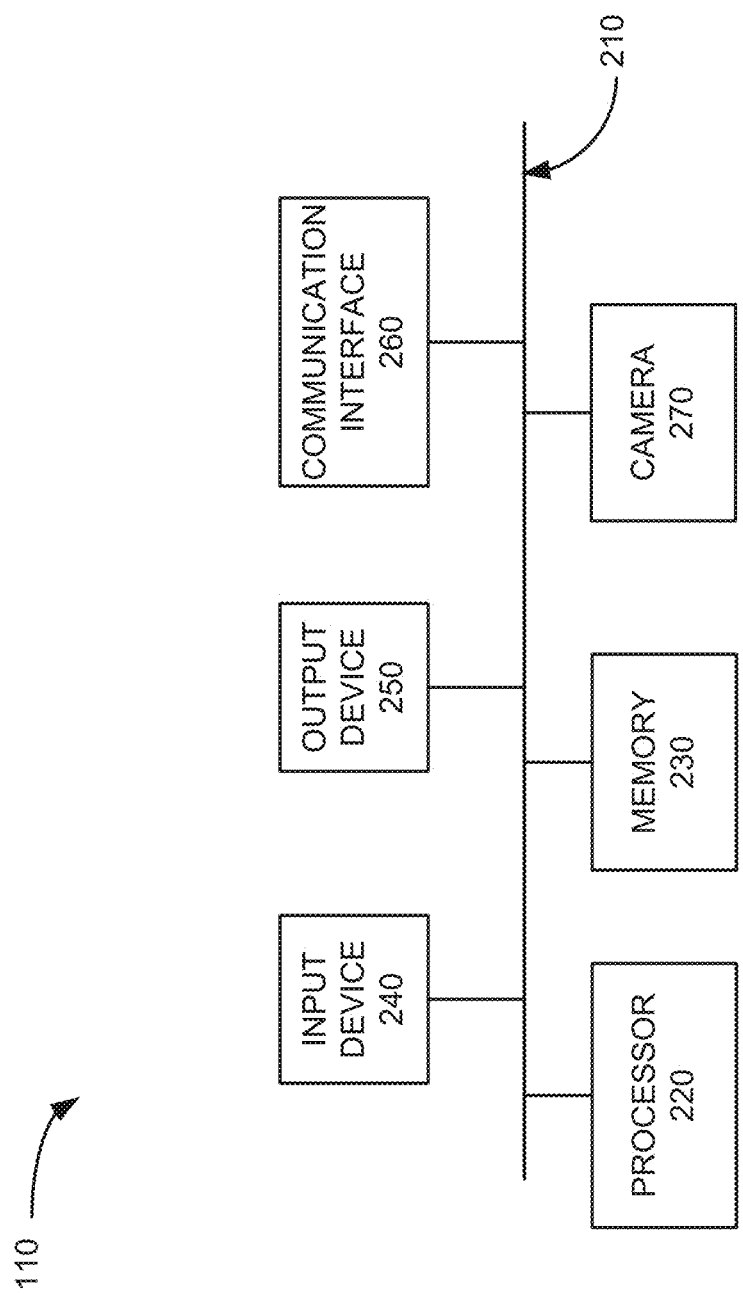
FIG. 2 illustrates an exemplary configuration of components implemented in one or more of the devices of FIG. 1.

FIG. 2 illustrates an exemplary configuration of user device 110. Other devices in network 100, such as network device 120 and POS system 130 may be configured in a similar manner. Referring to FIG. 2, user device 110 (network device 120 and/or POS system 130) may include bus 210, processor 220, memory 230, input device 240, output device 250, communication interface 260 and camera 270. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to user device 110, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD), a light-emitting diode (LED) based display, etc.), a printer, a speaker, etc.

Communication interface 260 may include a transceiver that user device 110 may use to communicate with other devices via wired, wireless or optical mechanisms. Communication interface 260 may also include one or more radio frequency (RF) transmitters, receivers and/or transceivers and one or more antennas for transmitting and receiving RF data via network 140. Communication interface 260 may also include a near field communication (NFC) interface that allows user device 110 to communicate with POS system 130 when user device 110 is located in close proximity to POS system 130. Communication interface 260 may further include a modem or an Ethernet interface to a LAN or other mechanisms for communicating with elements in a network, such as network 140 or another network.

Camera 270 may include components that allow user device 110 to capture still and/or moving images. Camera 270 may include a lens and shutter as well as other conventional camera elements used to capture images, such as receipts provided by retailers via paper or another hard copy format. The images of these captured receipts may be forwarded to network device 120.

The exemplary configuration illustrated in FIG. 2 is provided for simplicity. It should be understood that user device 110 (network device 120 and/or POS system 130) may include more or fewer devices than illustrated in FIG. 2. In an exemplary implementation, user device 110 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
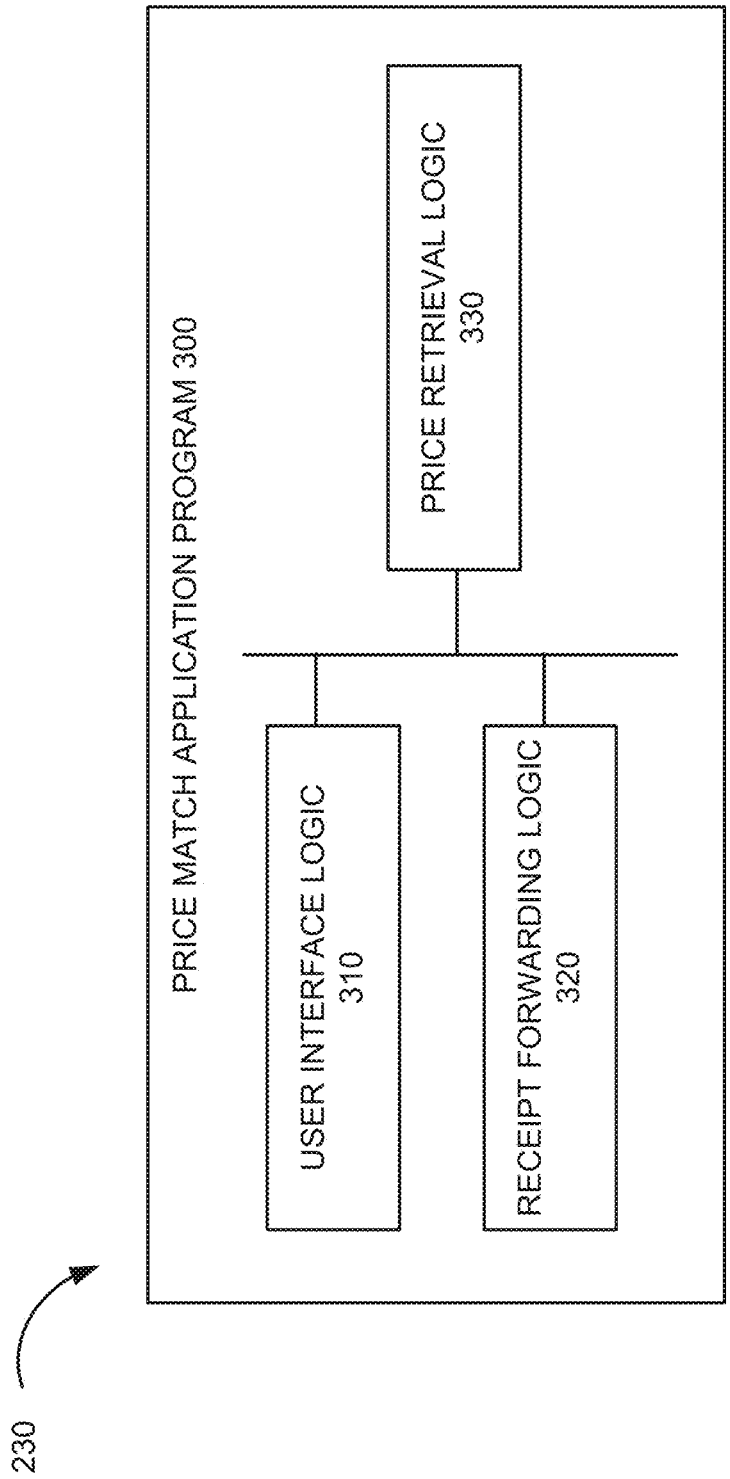
FIG. 3 illustrates an exemplary configuration of logic components implemented in one or more of the user devices of FIG. 1.

FIG. 3 is an exemplary functional block diagram of components implemented in user device 110 of FIG. 2. In an exemplary implementation, all or some of the components illustrated in FIG. 3 may be stored in memory 230. For example, referring to FIG. 3, memory 230 may include price match application program 300. Price match application program 300 may include software instructions executed by processor 220 that allow user device 110 to forward electronic receipts that identify purchases made by the user associated with user device 110. Price match application program 300 may include software instructions executed by processor 220 that allow user device 110 to receive information regarding prices offered by other retailers for items that the user is planning to purchase.

Price match application program 300 may include user interface logic 310, receipt forwarding logic 320 and price retrieval logic 330. Price match application program 300 and its various logic components are shown in FIG. 3 as being included in memory 230 of user device 110. In alternative implementations, these components or a portion of these components may be located externally with respect to user device 110. For example, in some implementations, one or more of the components of price match application program 300 may be located in or executed by another device external to user device 110, such as in network device 120, POS system 130 or in another device accessible via network 140.

User interface logic 310 may include logic to provide a user with an interface to select options associated with downloading and using price match application program 300. For example, user interface logic 310 may include a graphical user interface (GUI) that allows a user to select options for sharing receipts and/or providing receipts to network device 120. As an example, when a user associated with user device 110 downloads or installs price match application program 300 on user device 110, a number of options may be provided to the user. A first option may include an option to automatically share all receipts with network device 120, (also referred to herein as Clearinghouse 120). If the user selects this option, all electronic receipts obtained by user device 110 will be forwarded to network device 120 after the user has paid for the purchases via, for example, an electronic transaction, through the use of a credit or debit card, use of a mobile wallet application (e.g., ISIS), or via other electronic technology.

In instances where the consumer is not provided with an electronic or computer-readable receipt, the user may capture the receipt via camera 270. For example, the user may take a picture of the paper receipt and forward the image to network device 120 via an electronic mail (email) message, a short message service (SMS) message, multimedia messaging service (MMS) message, an instant message (IM) or other type of text message, or another type of communication.

User interface logic 310 may also include an option/selection that indicates that the user would like to approve each receipt for sharing with network device 120. If the user selects that option, a pop-up message or other type of message will be provided to the user via output device 250 (e.g., an LCD) inquiring whether the user would like to share the receipt.

Receipt forwarding logic 320 may include logic for forwarding electronic receipts to network device 120. For example, in the scenario described above in which the user received an electronic receipt and selected the option indicating that all receipts are to be shared, receipt forwarding logic 320 automatically forwards the receipts to network device 120 via network 140.

Price retrieval logic 330 may include logic to access and obtain price match information from network device 120. For example, in one implementation, prior to the user associated with user device 110 paying for items at, for example, a grocery store, price retrieval logic 330 may access network device 120 and obtain pricing information for one or more of the items that the user is planning to purchase. Price retrieval logic 330 may also provide information identifying a lower price for any item that the user is planning to purchase. For example, price retrieval logic 330 may output information identifying an item and the lower price via output device 250 (e.g., an LCD) display) of user device 110. The consumer may use the obtained information to present to the sales associate at POS system 130 for price matching, as described in more detail below.

Figure 4:
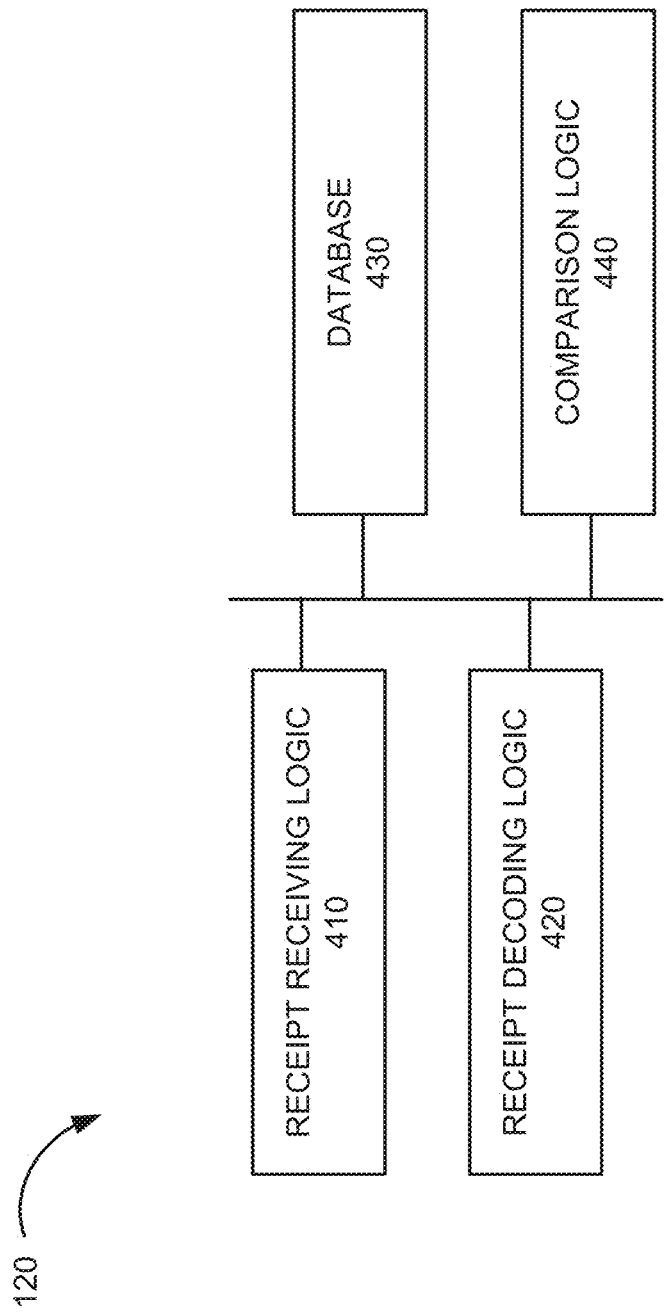
FIG. 4 illustrates an exemplary configuration of logic components implemented in the network device of FIG. 1.

FIG. 4 is an exemplary functional block diagram of components implemented in network device 120 of FIG. 1. Referring to FIG. 4, network device 120 may include receipt receiving logic 410, receipt decoding logic 420, database 430 and comparison logic 440. In alternative implementations, all or a portion of these components may be located externally with respect to network device 120. For example, in some implementations, one or more of the components of network device 120 may be located in or executed by another device external to network device 120. As an example, database 430 may be accessible to network device 120, but located externally to network device 120. As another example, one or more of the components shown in FIG. 4 may be located in user device 110 or POS system 130.

Receipt receiving logic 410 may include logic for receiving electronic receipts provided by user devices 110. For example, receipt receiving logic 410 may receive electronic receipts forwarded from thousands or millions of user devices 110. The term "electronic receipts" as used herein should be construed to include receipts provided in a computer-readable format, such as a format usable by a processor with or without further processing using optical character recognition or other image processing technology. Receipt receiving logic 410 may also receive images of electronic receipts captured by cameras 270 of user devices 110. Receipt forwarding logic 410 may forward the electronic receipts and/or images of receipts to receipt decoding logic 420.

Receipt decoding logic 420 may include logic for decoding or normalizing the received electronic receipts. For example, some electronic receipts may include bar code information that correlates to detailed information regarding a product. Other electronic receipts may include a brief text description of the product. Receipt decoding logic 420 may generate standardized information, from the information provided on each receipt, that will allow a third party, such as a retailer at which the user would like to purchase a product, to easily identify the product. This will enable the retailer to determine whether the price information and product information provided by network device 120 matches a product that the user plans to purchase. In some implementations, receipt decoding logic 420 may receive barcode or other information on an electronic receipt and perform a search, such as an Internet search, to identify missing information for a product. For example, the text information may not provide a full description of the product, such as a full name of the product, a size of the particular product, etc. Receipt decoding logic 420 may perform an Internet search or other type of search (e.g., an internal search of its databases) to obtain missing information with respect to the product for storage in database 430.

Figure 5:
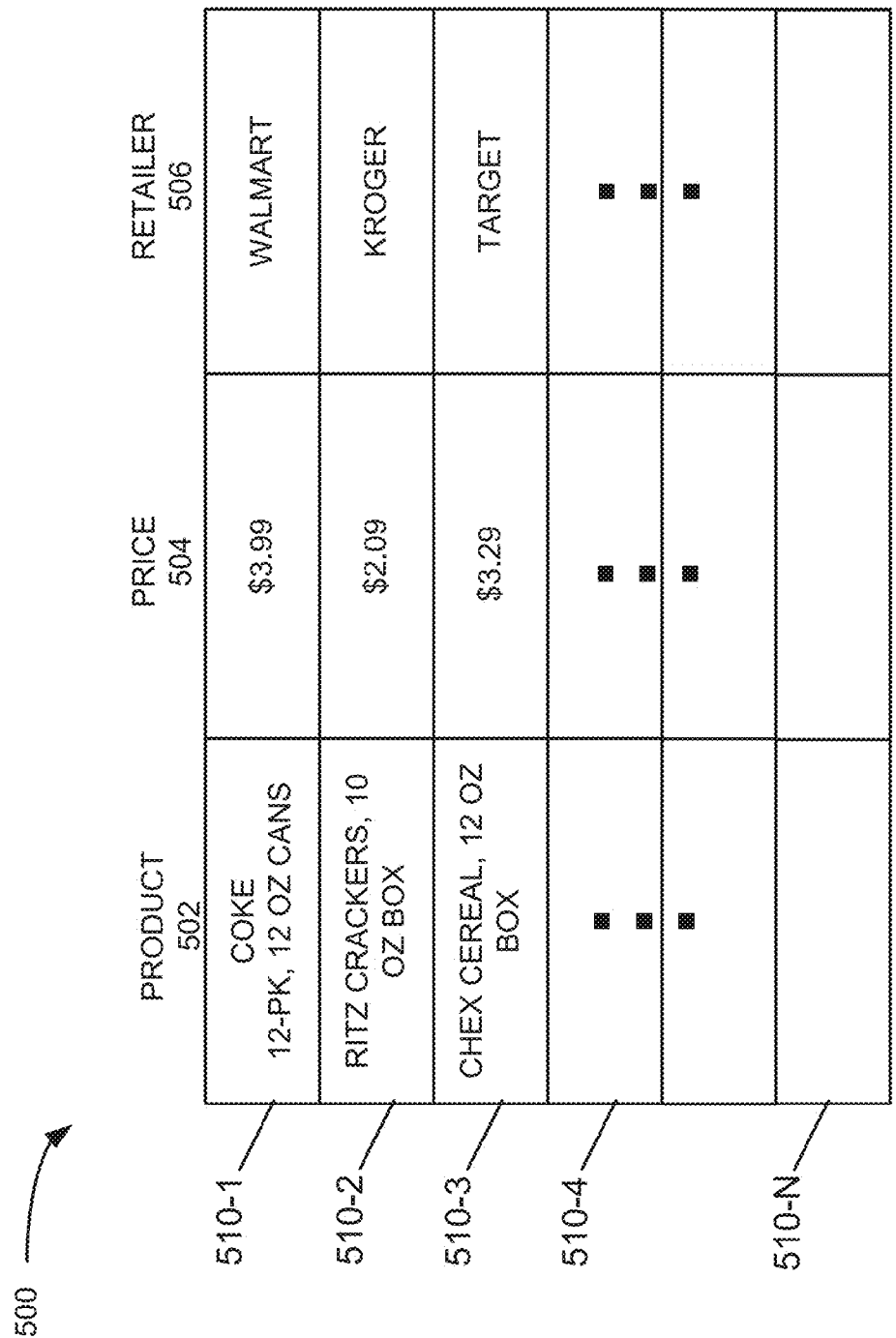
FIG. 5 illustrates an exemplary table generated by the network device of FIG. 2 in accordance with an exemplary implementation.

Database 430 may store price information and other information associated with products based on electronic receipts received and processed by receipt decoding logic 420. For example, database 430 may store pricing information, along with descriptive information for thousands of products. For example, FIG. 5 illustrates an exemplary table 500 stored in database 430. Referring to FIG. 5, table 500 may include product field 502, price field 504 and retailer field 506. It should be understood that table 500 may include additional and/or different fields than illustrated in FIG. 5 based on the particular implementation.

Product field 502 may include a text description of the product, along with other identifying information that will enable user devices 110 to query table 500 to identify products matching products that the users intend to purchase. The information in product field 502 may also enable a retailer to verify that a product to be purchased matches the product information stored in table 500. As an example, field 502 of entry 510-1 includes the information "Coke, 12-pk, 12 oz cans." In this case, a retailer can easily identify the product as corresponding to a 12 pack of 12 ounce cans of Coke.

Price field 504 includes a price for the product identified in product field 504. For example, price field 504 of entry 510-1 indicates that the price for a 12 pack of 12 ounce cans of Coke is $3.99. This price corresponds to a lowest price obtained from receipts/purchases made by consumers and forwarded to network device 120 from user devices 110 via network 140.

Retailer field 506 identifies the particular retailer or entity offering the lowest price identified in field 504. For example, retailer field 506 of entry 510-1 indicates that Walmart offered the 12 pack of 12 ounce cans of Coke for $2.99. The information in table 500 may be used by a consumer to perform a lookup to identify the lowest offered prices for various products that the consumer would like to purchase, as described in more detail below.

Network device 120 (e.g., database 430) may also store the actual electronic receipts, upon which the data in table 500 was generated. These receipts may be provided to consumers to prove a lower price for the item, as described in more detail below.

Returning to FIG. 4, comparison logic 440 may identify information from electronic receipts and determine whether newly received electronic receipts identify products not already stored in table 500. For example, the first electronic receipt received by network device 120 that identifies "Ritz Crackers, 10 oz box," will be stored by comparison logic 440 in table 500, as illustrated by entry 510-2, along with the price in field 504 and retailer in field 506 of entry 510-2.

Comparison logic 440 may also determine whether any products identified on an electronic receipt include a lower price than that stored in price field 504 of the matching entry.

For example, if an electronic receipt includes "Chex Cereal, 12 oz box" at $2.89 and an entry in table 500 includes "Chex Cereal, 12 oz box" with a price of $3.29, as indicated by entry 510-3, comparison logic 440 determines that the newly received receipt includes a lower price for a product in table 500. In this case, comparison logic 440 modifies entry 510-3 to identify the new, lower price of $2.89 in field 504, as well as identify the retailer that sold the product in field 506.

Comparison logic 440 also receives information regarding purchases not yet made by consumers and identifies whether any of the planned purchases match information stored in table 500. For example, network device 120 receives queries from consumers to determine whether any retailers offer the same or similar items planned for purchase at a lower price. Comparison logic 440 receives the query and searches table 500 to determine whether the price in table 500 is lower than the price associated with any of the planned purchases. If comparison logic 440 identifies any lower prices in table 500, network device 120 may provide the lower price information to the requesting user device 110.

Figure 6:
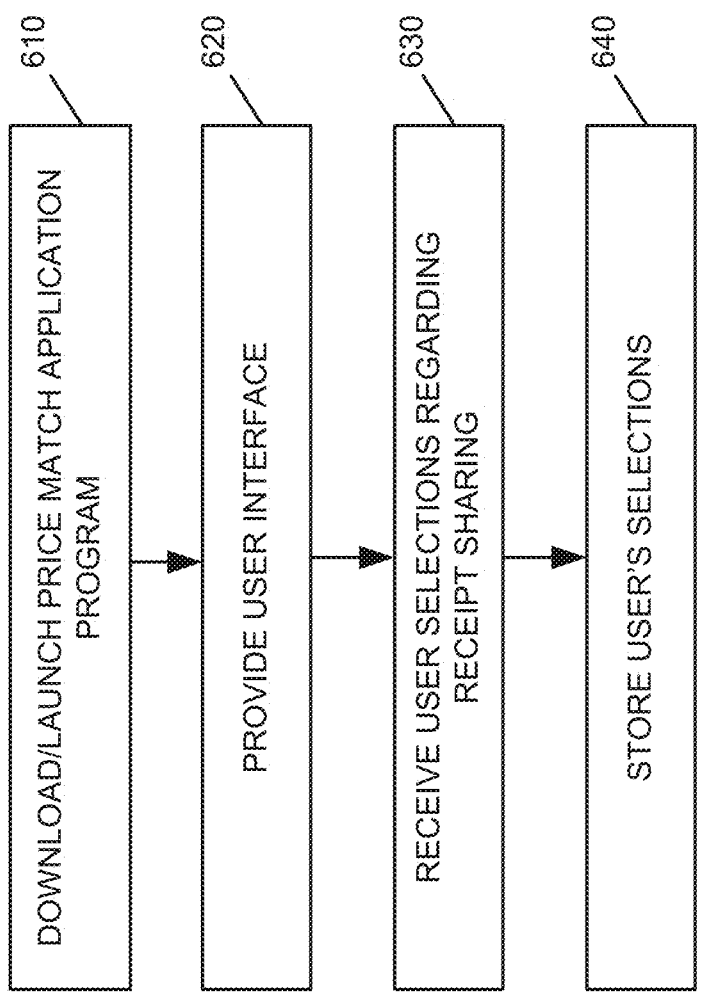
FIG. 6 is a flow diagram illustrating processing associated with initializing and providing preferences associated with use of the program of FIG. 3 in accordance with an exemplary implementation.

FIG. 6 is a flow diagram illustrating exemplary processing associated with downloading, initializing and setting preferences with respect to execution of price match application program 300. In this example, assume that a party associated with user device 110-1 would like to download price match application program 300. Processing may begin with the party associated with user device 110-1 (also referred to herein as the user or consumer) downloading price match application program 300 (block 610). For example, assume that user device 110 is a smart phone and that network device 120 provides price match application program 300 to customers. In this case, the user may access network device 120 via user device 110 and download price match application program 300 to memory 230 of user device 110. In other implementations, user device 110-1 may download price match application program 300 via an "application store" provided by a website offering a large number of applications.

In either case, the user may then launch or execute price match application program 300 (block 610). Upon execution of price match application program 300, user interface logic 310 may provide a GUI for the user to customize the program (block 620). For example, the GUI may provide an option for indicating that all electronic receipts for the user associated with user device 110-1 will automatically be shared and forwarded to network device 120. The GUI may also provide an option for indicating that the user will share only some electronic receipts with network device 120, such as certain types of receipts (e.g., grocery receipts, receipts associated with the purchase of electronic equipment, etc.). In still other instances, the GUI may provide an option indicating that the user would like to approve each electronic receipt prior to forwarding the electronic receipt to network device 120. Assume that the user selects (e.g., checks a box on the GUI) the option to automatically share all electronic receipts with network device 120 (block 630).

In each case, price match application program 300 stores the information regarding the user's selection (block 640). After the user has entered the desired information and price match application program 300 has stored the user-selected information, price match application program 300 may be used to share electronic receipts, as well as perform price look ups, as described in detail below. When sharing receipts with network device 120, no personal information associated with the user or user device 110 is provided to network device 120. That is, any personal information is removed from the receipts and only information regarding the purchases, price and date is provided and/or stored at network device 120. In this manner, all receipts received and stored by network device 120 are anonymous and no party is able to identify any particular users/user devices associated with the purchases.

Figure 7:
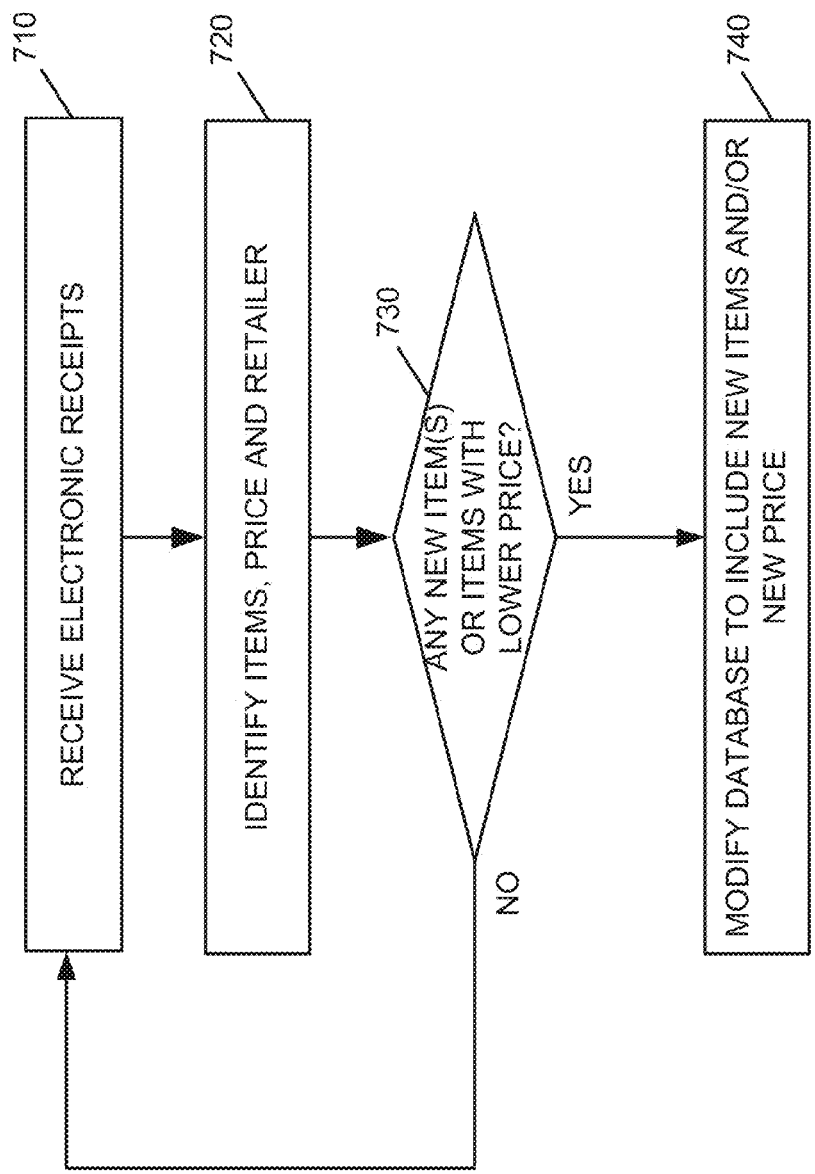
FIG. 7 is a flow diagram illustrating exemplary processing associated with generating the table of FIG. 5 in accordance with an exemplary implementation.

FIG. 7 is a flow diagram illustrating exemplary processing associated with generating and populating a price lookup table, such as table 500. Processing may begin with network device 120 receiving electronic receipts from user devices 110 (block 710). For example, receipt receiving logic 410 may receive electronic receipts from thousands or millions of user devices 110 that include price match application programs 300. These receipts may represent actual purchases made by consumers. As discussed above, receipt receiving logic 410 may receive the electronic receipts via email, SMS, MMS, IM, or another type of communication via network 140. Receipt receiving logic 410 may also receive images of paper receipts captured by camera 270 of user device 110. These images may be sent via email, SMS, MMS, IM or another type of communication via network 140.

Receipt decoding logic 420 receives the electronic receipt information and identifies the purchased items, the price of each purchased item and the retailer where the items were purchased (block 720). For example, as discussed above, some electronic receipts may include bar code information that correlates or translates to detailed information regarding a product. Other electronic receipts may include a brief text description of the product. Receipt decoding logic 420 may generate standardized information from the information provided on each receipt.

As an example, in some implementations, receipt decoding logic 420 may receive barcode or other information on an electronic receipt and perform a search, such as an Internet search, to identify information for the product corresponding to the barcode. For example, the barcode information may not identify a full name for the particular product, a size of the particular product, etc. Receipt decoding logic 420 may perform an Internet search to obtain missing information with respect to the product for storage in database 430. For example, receipt decoding logic 420 may access a website identifying products offered by the retailer at which the product was purchased and use the barcode information to search the database for the full name of the product, the size, etc. As another example, receipt decoding logic 420 may access databases internal to network device 120 and determine that the abbreviation "YOG" corresponds to "yogurt." In each case, receipt decoding logic 420 may generate standardized information regarding each product, along with the purchase price and retailer (block 720).

Comparison logic 440 may determine whether any new items are contained in a newly received receipt or whether a newly received receipt includes a lower price, for an item already stored in table 500 (block 730). If a new item is identified (block 730—yes), comparison logic 440 stores the information in table 500 (block 740). For example, the first electronic receipt received by network device 120 that identifies "Ritz Crackers, 10 oz box," will be stored by comparison logic 440 in table 500, as illustrated in entry 510-2, along with the price in field 504 and retailer in field 506 (block 740).

Comparison logic 440 may also determine whether any products identified on an electronic receipt include a lower price than that stored in price field 504 of the matching entry. For example, if an electronic receipt includes "Chex Cereal, 12 oz box" at $2.89 and an entry in table 500 includes "Chex Cereal, 12 oz box" with a price of $3.29, as indicated by entry 510-3, comparison logic 440 determines that the newly received receipt includes a lower price for a product in table 500 (block 730—yes). In this case, comparison logic 440 modifies entry 510-3 to identify the new, lower price of $2.89 in field 504, as well as identify the retailer that sold the product in field 506 of entry 510-3.

If, however, no new item is received, or no existing item with a lower price is identified (block 730—no), processing continues to block 710. Network device 120 may continue to process received electronic receipts and update table 500. In this manner, table 500 includes a database of prices paid by actual consumers for products stored in table 500. In some instances, comparison logic 440 may remove "stale" items from table 500, such as prices obtained from receipts received more than 30 days, 60 days, etc., in the past. In each case, table 500 includes a listing of products and current pricing that may then be used by user devices 110 for price matching, as described in detail below.

Figure 8:
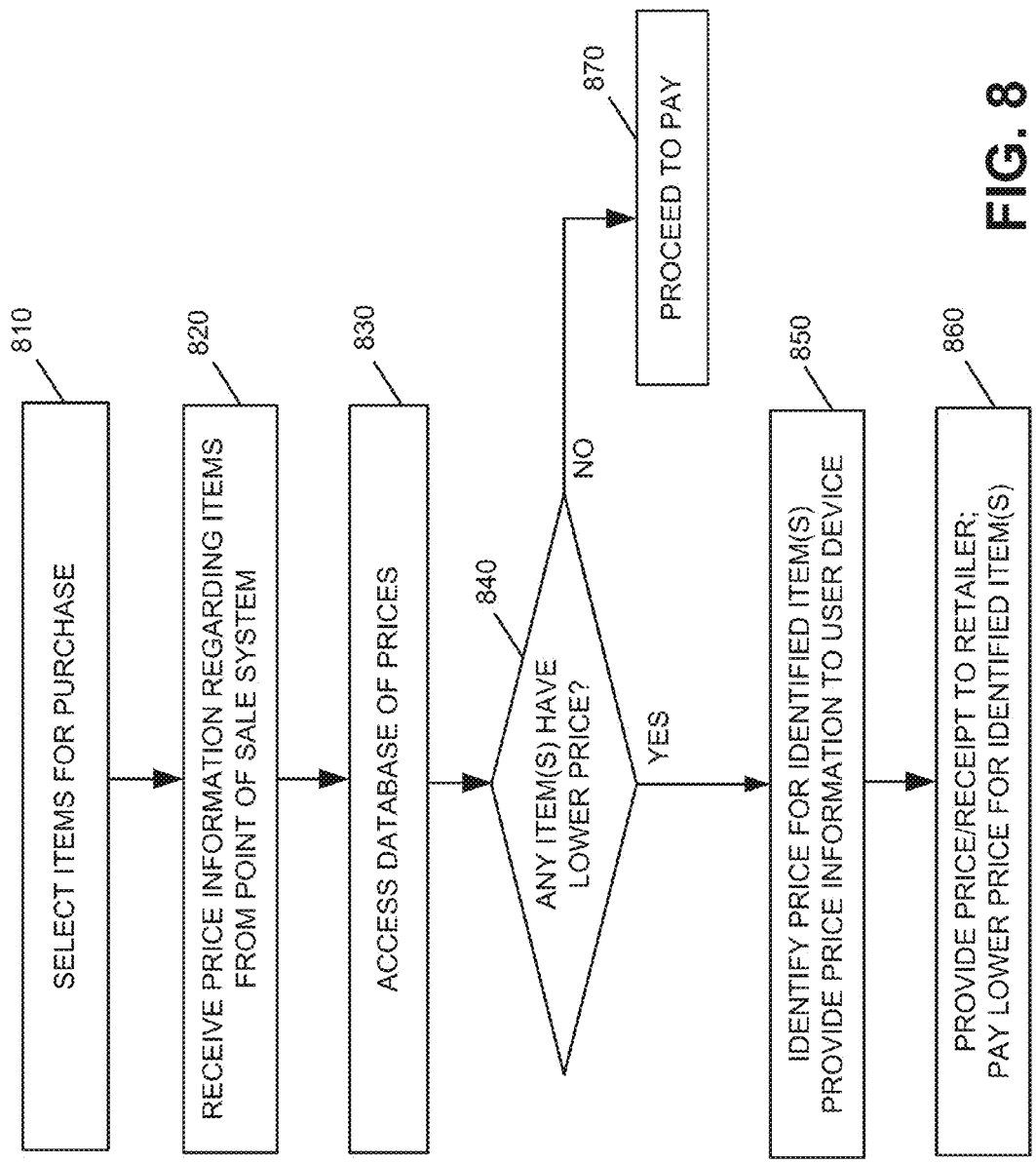
FIG. 8 is a flow diagram illustrating exemplary processing associated with the components of FIG. 1 in accordance with an exemplary implementation.

FIG. 8 illustrates exemplary processing associated with execution of price match application program 300 by user devices 110 to perform price match checking. In this example, processing may begin with a consumer associated with user device 110-1 selecting items to purchase (block 810). For example, assume that the consumer is at a grocery store shopping for groceries.

Further assume that POS system 130 has scanned all the items and provided an electronic listing of the items, along with the retailer's prices for each item, to user device 110-1 (block 820). User device 110-1 receives the electronic listing and price match application program 300 may query network device 120 to identify items in table 500 that match items provided in the user's electronic listing (block 830).

For example, price retrieval logic 330 may send a query to network device 120 that includes the electronic receipt/listing of items. Receipt decoding logic 420 decodes the receipt, if necessary, and forwards the decoded information to comparison logic 440. Comparison logic 440 may then compare information for the items selected for purchasing by the consumer to information in product field 502 of table 500. Comparison logic 440 may identify any matching entries. Comparison logic 440 may also determine whether the price for any matching entry is lower than the price provided by the retailer with whom the user is interacting (block 840).

For example, suppose that the user's basket of items includes a 12 pack of 12 ounce cans of Coke and the retailer associated with POS system 130 is charging a price of $4.49. In this case, price field 504 of entry 510-1 indicates that the lowest price for this item is $3.99. Comparison logic 440 may identify lower prices for other items in a similar manner (block 850).

Comparison logic 440 may forward the information identifying the lower priced items, including descriptions from product field 502 and the identities of retailers from retailer field 506, to user device 110 (block 850). Price retrieval logic 330 may receive the price information and provide the price information to the retailer at POS system 130 (block 860). For example, price retrieval logic 330 may output a description of the product, the price of the product, the identity of the retailer that sold the product and the date on which the product was sold via output device 250, such as an LCD screen on user device 110. The user may then show this information to the sales associate at POS system 130 to obtain a price match by the retailer. Price retrieval logic 330 may similarly output the lower price information to the retailer for all products in which a lower price was identified.

Figure 9:
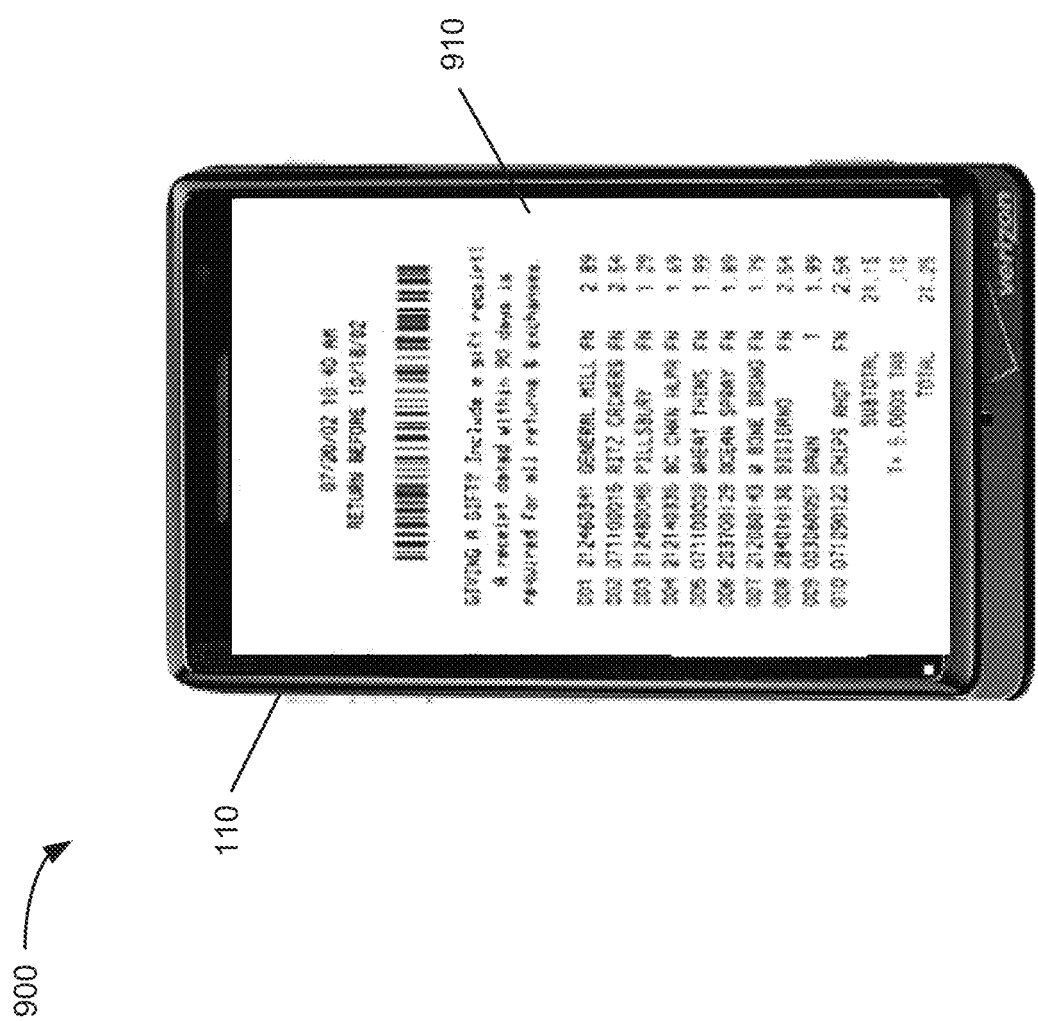
FIG. 9 illustrates an exemplary output screen consistent with the processing of FIG. 8.

In some instances, price retrieval logic 330 may receive an actual receipt from network device 120 as proof that the product was actually purchased by a consumer at the lower price. For example, FIG. 9 illustrates an exemplary scenario 900 that includes user device 110 displaying an actual receipt 910 that proves that the product was actually purchased at a lower price at a competitor. The consumer at user device 110 may show this receipt, if requested by the retailer, to prove the lower price. In each case, the retailer will match the lower price and the user will proceed to pay the lower price for the identified item(s) (block 860).

If, however, comparison logic 440 does not identify any items having a lower price (block 840—no), price retrieval logic 440 will send a message to user device 110 indicating that no lower prices were identified. In this case, the consumer will proceed with the checking out process and pay for the items (block 870).

As described above, a user may interact with network device 120 to perform price checking prior to purchasing products to ensure that he/she is receiving a lowest possible price. In one implementation, a consumer/user may pay a monthly or annual membership fee to obtain access to price lookup table 500. In other implementations, a consumer may pay a small amount (e.g., one cent or a few cents) for each access to network device 120 for price match checking. In still other implementations, manufacturers may pay a fee for providing coupons to user devices 110 executing price match application program 300.

Implementations described herein provide for price match checking by consumers without requiring consumers to spend time searching for lower priced advertisements. In addition, consumers may share receipts in a social manner with network device 120 to enable other consumers to benefit from lower prices. This may allow consumers to save money, as well as improve the shopping experience.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been mainly described above with respect to user device 110 interacting with network device 120 to share receipts and obtain price checking information. In other implementations, user device 110 may store a small version of table 500 in user device 110. The smaller version of the price lookup table may include pricing information associated with products that the user frequently purchases. This information may be obtained from table 500 at predetermined times. As a result, if the user is unable to contact network device 120 at a checkout time, user device 110 may perform price match checking using the smaller lookup table stored locally on user device 110.

In other implementations, the retailer associated with POS system 130 may store a lookup table similar to table 500. In this case, upon checkout, POS system 130 may automatically provide the lowest price to consumer 110, without user device 110 having to contact network device 120 and/or without user device 110 having to execute price match application program 300. Providing such a service by a retailer may increase sales for that particular retailer.

Further, the implementations described above refer to storing price information for goods purchased from retailers and checking purchase prices for goods planned for purchase. In other implementations, a user device 110 may be used while a user is shopping to check a lowest price prior to selecting any items for purchase. For example, price match application program 300 may include a scanner or other image capturing device (e.g., camera 270) that the consumer may use to scan/capture a barcode. In this instance, price match application program 300 may forward the barcode information or other information regarding the product to network device 120. Network device 120 may then provide user device 110 with the lowest price for that item stored in table 500. This may save the user time in deciding whether to purchase the product.

In addition, features described above refer to products offered by retailers. It should be understood that price match application program 300 may also be used to check the prices for services, as well as products, offered by any business entity.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Further, while series of acts have been described with respect to FIGS. 6-8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
    receiving, at a network device and from a plurality of users, information identifying a first plurality of items purchased by the plurality of users over a period of time, the information including a price for each of the first plurality of items, wherein the network device includes a processor;
    storing, by the network device, the information in a database;
    receiving, by the network device via an external network and from a second plurality of users, additional information identifying a second plurality of items purchased by the second plurality of users over a second period of time, the additional information including a price for each of the second plurality of items;
    identifying, by the network device, a first item in the first plurality of items stored in the database that matches a second item in the second plurality of items;
    determining, by the network device, whether the price for the second item is lower than the price for the first item stored in the database;
    updating, by the network device, the database to include the price for the second item, in response to determining that the price for the second item is lower than the price for the first item;
    receiving, from a user device, a query including information identifying a third plurality of items corresponding to items planned to be purchased by a user associated with the user device, the information including a price for each of the third plurality of items;
    determining, by the network device, whether the database includes a lower price for any of the third plurality of items,
    wherein the determining whether the database includes a lower price comprises:
        comparing information identifying the third plurality of items to information stored in the database to determine whether any of the third plurality of items matches an item stored in the database,
        identifying a third item in the database that matches a first one of the items planned to be purchased by the user, and
        determining whether the price for the third item is lower than the price for the first item planned to be purchased by the user; and
    forwarding, by the network device, information to the user device identifying the price for the third item, in response to determining that the price for the third item is lower than the price for the first item planned to be purchased by the user.

2. The computer-implemented method of claim 1, wherein the received information comprises receipts associated with purchases made by the first plurality of users and the additional information comprises receipts associated with purchases made by the second plurality of users.

3. The computer-implemented method of claim 2, wherein the receipts associated with purchases made by the first plurality of users identify entities that sold each of the first plurality of items and wherein the storing further comprises:
    storing information, in the database, that identifies the entities that sold each of the first plurality of items.

4. The computer-implemented method of claim 1, wherein the forwarding information to the user device further comprises:
    forwarding a receipt associated with a previous purchase of the third item.

5. The computer-implemented method of claim 1, wherein the receiving information identifying a first plurality of items comprises receiving a description of each of the first plurality of items, the method further comprising:
    modifying the description of at least some of the first plurality of items to include a standardized description.

6. The computer-implemented method of claim 1, further comprising:
    updating the database to remove price information that has been stored for a predetermined period of time.

7. The computer-implemented method of claim 1, further comprising:

at least one of charging a predetermined fee to the user for each query to the database for price checking, charging a monthly fee to the user for providing access to the database for price checking or charging a yearly fee to the user for yearly access to the database for price checking.

8. A non-transitory computer-readable medium having stored thereon sequences of instructions which, when executed by at least one processor, cause the at least one processor to:
receive information from a point of sale system identifying a first plurality of items and a price associated with each of the first plurality of items;
transmit, via a communication interface, a query to a network device via a wireless network to query a database to determine whether the database includes information indicating that any of the first plurality of items was previously purchased at a second price that is lower price than a first price included in the received information associated with the first plurality of items,
wherein the network device compares information identifying the first plurality of items to information stored in the database to determine whether any of the first plurality of items is identical to or similar to an item stored in the database;
receive, from the network device, information identifying the second price, in response to the query and in response to the network device determining that a second item is identical to or similar to a third one of the first plurality of items and the price for the second item stored in the database is lower than the price for the third one of the first plurality of items;
output the received information identifying the second price to a display; and
provide, to a user, options associated with transmitting receipts to the network device, wherein the options include at least one of automatically transmitting receipts after purchases made by the user, automatically transmitting predetermined types of receipts after purchases made by the user or inquiring whether the user would like to transmit each receipt.

9. The non-transitory computer-readable medium of claim 8, wherein the display is associated with the user planning to purchase the first plurality of items.

10. The non-transitory computer-readable medium of claim 8, further comprising instructions for causing the at least one processor to:
transmit receipts associated with purchases made by the user associated with a device that includes the at least one processor to the network device.

11. The non-transitory computer-readable medium of claim 8, wherein when outputting the received information, the instructions cause the at least one processor to:
output a receipt associated with the previous purchase of the second item to the display.

12. A device, comprising:
a memory configured to store a database; and
processing logic configured to:
receive, from a plurality of users, information identifying a first plurality of items purchased by the plurality of users, the information including a price for each of the first plurality of items,
store the information in the database,
receive, from a second plurality of users, additional information identifying a second plurality of items purchased by the second plurality of users, the additional information including a price for each of the second plurality of items,
identify a first item in the first plurality of items that matches a second item in the second plurality of items,
determine whether the price for the second item is lower than the price for the first item stored in the database
update the database to include the price for the second item, in response to determining that the price for the second item is lower than the price for the first item,
receive, from a user device, a query including information identifying a third plurality of items corresponding to items planned to be purchased by a user associated with the user device, the information including a price for each of the third plurality of items, and
determine whether the database includes a lower price for any of the third plurality of items,
wherein when determining whether the database includes a lower price, the processing logic is further configured to:
compare information identifying the third plurality of items to information stored in the database to determine whether any of the third plurality of items matches an item stored in the database,
identify a fourth item in the database that matches one of the third plurality of items planned to be purchased by the user, and
determine whether the price for the fourth item is lower than the price for the one of the third plurality of items planned to be purchased by the user, and
forward information to the user device identifying the price for the fourth item, in response to determining that the price for the fourth item is lower than the price for the one of the third plurality of items planned to be purchased by the user.

13. The device of claim 12, further comprising:
updating the database to remove price information that has been stored for a predetermined period of time.

14. The computer-implemented method of claim 1, further comprising:
decoding the received information identifying the first plurality of items;
determining that information associated with at least one of the first plurality of items that is needed for storing in the database is missing; and
performing a search to obtain the missing information with respect to the at least one of the first plurality of items.

15. The computer-implemented method of claim 1, further comprising:
receiving, from a second user device, a second query including information identifying a fourth plurality of items corresponding to items planned to be purchased by a second user associated with the second user device, the information including a price for each of the fourth plurality of items;
determining, by the network device, whether the database includes a lower price for any of the fourth plurality of items; and
forwarding, by the network device, information to the second user device indicating that no lower prices were identified, in response to determining that the database does not include a lower price for any of the fourth plurality of items.

16. The computer-implemented method of claim 1, wherein the storing information in a database comprises storing information identifying a plurality of products or services, a price for each of the products or services and an entity that sells or provides each of the products or services.

17. The non-transitory computer-readable medium of claim 8, further comprising instructions for causing the at least one processor to:
   receive a paper receipt from a second point of sale system; and
   transmit an image of the paper receipt, taken by a camera associated with a device that includes the at least one processor, to the network device.

18. The non-transitory computer-readable medium of claim 8, wherein when transmitting a query to the network device, the instructions cause the at least one processor to:
   transmit at least one of an electronic mail message, a short message service message, a multimedia messaging service message or an instant message.

19. The non-transitory computer-readable medium of claim 8, further comprising instructions for causing the at least one processor to:
   obtain information from the database, the obtained information identifying a portion of the items stored in the database and price information for the identified portion of the items;
   store, in a memory of a device that includes the at least one processor, the obtained information; and
   query the information stored in the memory to determine whether a lower price exists for any of a second plurality of items purchased by the user associated with the device.

20. The device of claim 12, wherein the processing logic is further configured to:
   decode the received information identifying the first plurality of items;
   determine that information associated with at least one of the first plurality of items that is needed for storing in the database is missing; and
   performing an Internet search to obtain the missing information with respect to the at least one of the first plurality of items.

* * * * *